June 28, 1955 W. E. O'SHEI 2,711,553
WINDSCREEN WIPER ARM
Filed Oct. 6, 1952 2 Sheets-Sheet 1
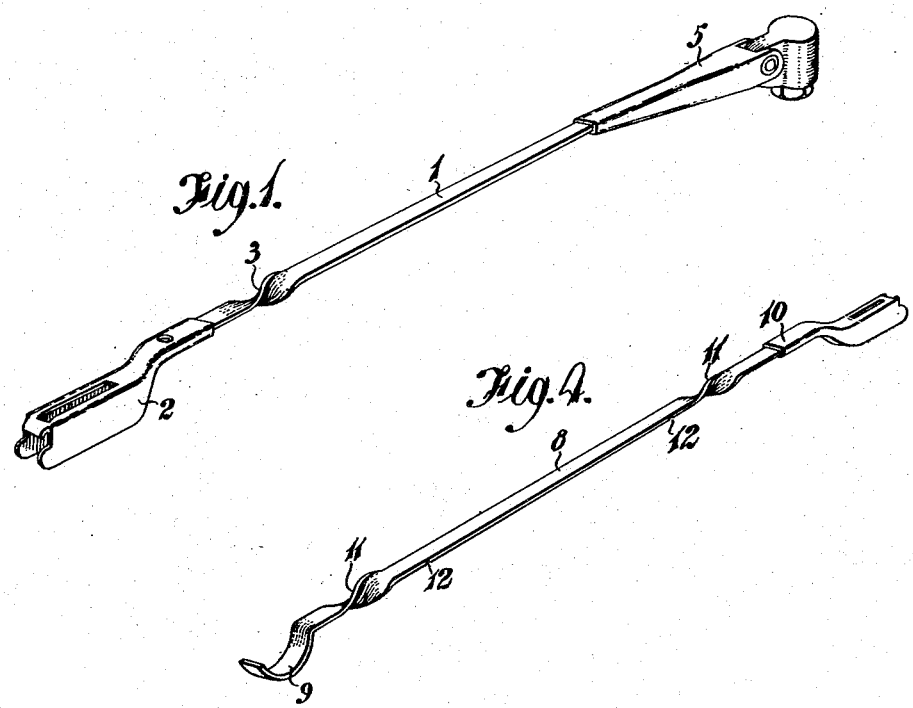
Inventor
William E. O'Shei
By
Emery Holcombe & Blair
Attorney

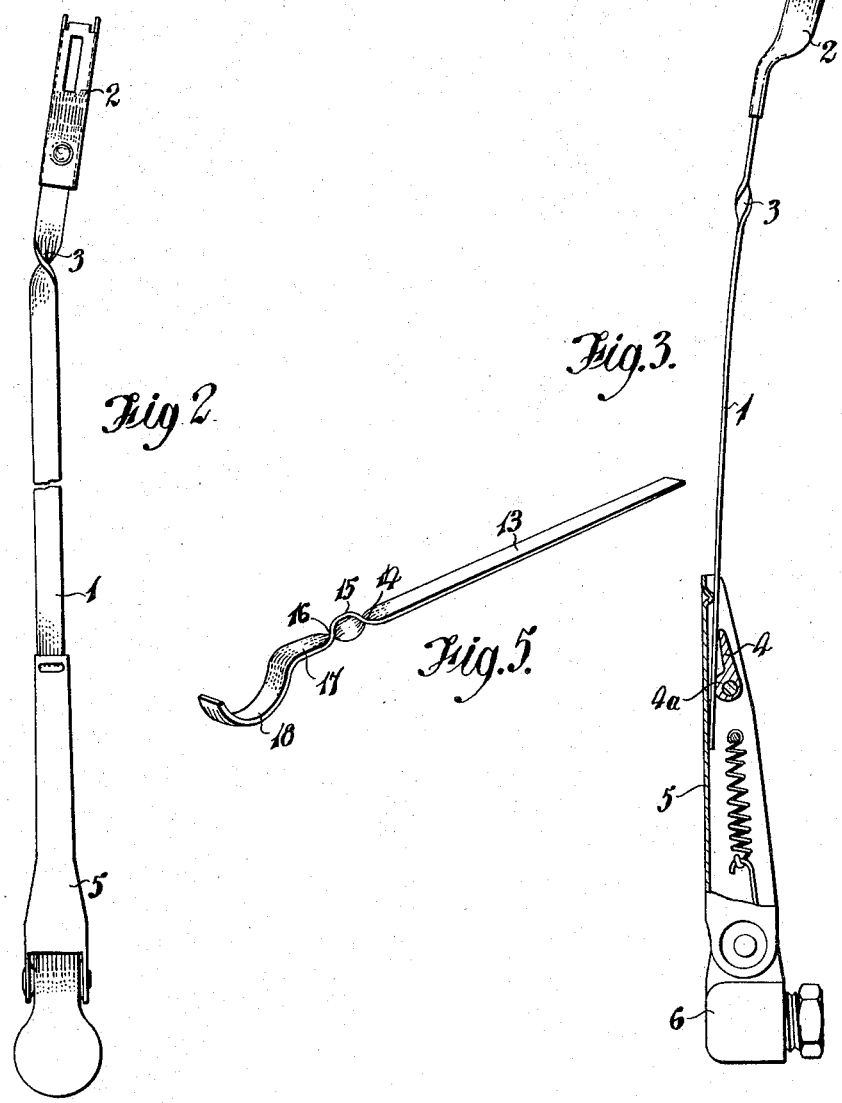

United States Patent Office 2,711,553
Patented June 28, 1955

2,711,553

WINDSCREEN WIPER ARM

William Edward O'Shei, London, England

Application October 6, 1952, Serial No. 313,214

Claims priority, application Great Britain October 8, 1951

4 Claims. (Cl. 15—255)

The present invention relates to windscreen wipers, and more particularly to an improved windscreen wiper arm for carrying the windscreen wiper blade. Such wiper arms sometimes have the blade attaching fitting or means at the free end of the arm inclined either to one side or the other of the longitudinal direction of the arm, as well as sometimes extending in the longitudinal direction and the present invention has for its object to provide a wiper arm of which the blade attaching end can easily be bent without special tools whereby the wiper arm may be adapted by a supplier to the requirements of the wiper system.

Windscreen wiper arms are generally constructed with the outer portion made of strip steel with the plane of the strip lying substantially parallel to the surface of the windscreen. According to the present invention a portion of the strip adjacent the outer end is twisted approximately at right angles to the normal plane of the strip, whilst the main length of the strip and its free extremity still remain with their planes substantially parallel to the surface of the windscreen. By provision of this twisted portion the outer extremity of the strip can easily be bent either to one side or the other of the longitudinal direction of the arm either by hand or by the use of a pair of pliers so that the blade attaching fitting at the end of the arm can be inclined in the required direction.

In one embodiment according to the invention, a 180° twist is imparted to a short section of the strip adjacent its outer end so that what would normally be the inner surface of the strip constitutes the outer surface at the free extremity. Thus conventional blade attaching fittings can be fitted to the outer extremity of the arm without modification or the outer extremity may be formed of the known curved or other shape for attaching the end of the arm to blades adapted to be fitted to such a formed end of the arm. The 180° twist is imparted to the strip as close to the outer extremity as possible and enables the arm to be bent to one side or the other to suit requirements and without fracturing the material of the strip.

In another embodiment a portion of the strip adjacent its outer end can be bent at right angles to the plane of the strip, the outer end of the strip then being twisted back in the reverse direction so as to lie in the same plane as the inner portion of the strip, said free end being provided with a blade attaching fitting or formed for attachment to a blade in known manner.

According to a further feature of the invention the strip constituting the outer arm portion is made separate from the inner arm portion and is detachably connected with the inner arm portion, whereby the outer arm portion with different blade attaching fittings or the like may be interchangeably assembled with the inner arm portion which may be standard for all arms. One such construction which may be employed is described in my co-pending application No. 194,757, filed November 9, 1950 now Patent No. 2,691,790. If desired opposite ends of the outer arm strip portion may be provided with alternative fittings or means for connection to the wiper blade, whereby the same outer arm portion may be assembled with the inner arm portion to produce a wiper arm with either of two alternative types of blade connection depending upon which way round the outer arm portion is assembled to the inner arm portion. If desired, that fitting or connection means which will not be used in the assembled arm may be severed from the outer arm portion before assembly. Either one or each end of the strip portion may be provided with a twisted portion as above described to enable the blade connection to be inclined to the longitudinal direction of the strip. To facilitate the unrequired end being broken off by means, for example, of a pair of pliers (thereby avoiding the necessity for a sawing operation) the metal strip may be weakened adjacent each end at a point on that side of the twisted portion which is remote from the adjacent free end.

In order that the invention may be more fully understood, some embodiments thereof will now be described with reference to the accompanying drawings, in which:

Fig. 1 shows a perspective view of a windscreen wiper arm according to the invention.

Fig. 2 shows a plan view of the wiper arm in Fig. 1 with the outer end inclined.

Fig. 3 shows a longitudinal section through the wiper arm.

Fig. 4 shows a modified construction of the outer arm portions.

Fig. 5 shows a perspective view of a modified wiper arm according to the invention.

Referring to Figs. 1, 2 and 3, the arm comprises an outer arm portion in the form of a metal strip 1, preferably a steel strip, adapted to lie substantially parallel to the surface of a windscreen. The inner end of the outer arm portion is attached to an inner arm portion 5 which may be constructed as described in the aforementioned copending application No. 194,757 filed November 9, 1950 now Patent No. 2,691,790. In this construction the inner end of the outer arm portion is detachably held to the inner arm portion 5 by means of a cam 4a carried by a lever 4 pivoted adjacent the outer end of the inner arm portion. An arm head 6, for attachment to a driving spindle is carried at the inner end of the inner arm portion 5.

The outer end of the outer arm portion is formed with a blade attaching fitting 2 for fixing to a wiper blade. According to the invention, the strip 1 is given a 180° twist at 3 so that what would normally be the inner surface of the strip constitutes the outer surface at the outer end. This twist enables the outer end of the arm to be bent to one side or the other, as shown in Fig. 2, and thus the outer end can be easily adjusted to the desired inclined position without the use of special tools. As the outer arm portion is detachably secured to the inner arm portion 5, different outer arm portions carrying different types of blade attaching fittings can be interchangeably assembled on the inner arm portion, which may be standard for all arms.

In the embodiment shown in Fig. 4, the strip 8, which forms an outer arm portion, is provided at opposite ends, with alternative fittings 9 and 10 respectively, whereby the same outer arm portion may be assembled with an inner arm portion to produce a wiper arm with either of two alternative types of blade connection. Twisted portions 11, are formed adjacent each end of the strip 8, and in order to facilitate the removal of the unrequired end, for example by means of a pair of pliers, the strip 8 is weakened by means of notches 12 transverse of the strip, and located adjacent each end at a point on that side of the twisted portion 11 remote from the blade attaching fittings.

Fig. 5 illustrates yet another form of the invention in which instead of imparting a 180° twist to the strip 13, forming the wiper arm, this strip is bent at right angles, as at 14, so that a portion 15 is formed lying normal to the plane of the strip 13. This portion 15 is then bent back again at right angles at 16 so that the outer end 17, which carries a blade attaching fitting 18, lies in the same plane as the main portion of the strip 13. By bending the portion 15 the arm can be inclined as desired without fracturing the material of the arm.

I claim:

1. For a windscreen wiper arm, an outer arm portion, comprising a metal strip, a twisted portion approximately at right angles to the plane of the strip formed adjacent each end of the strip, each of said ends and said main length of the strip lying in the same plane, a first blade attaching means at one end of the strip, a second blade attaching means at the other end of the strip, and at least one notch formed transverse of the strip in the main length of the strip adjacent a twisted portion, on that side of said twisted portion remote from one of said ends.

2. A windscreen wiper arm, comprising an inner arm portion, means for securing one end of the inner arm portion to a driving spindle, a metal strip constituting an outer arm portion having one end connected to the other end of said inner arm portion, blade attaching means at the free end of said strip, and a 180° twist around the longitudinal axis of said strip imparted to a short section of said strip, said twisted portion being formed adjacent to, but spaced from said blade attaching means.

3. A windscreen wiper arm, comprising an inner arm portion incorporating means for securing said inner arm portion to a driving spindle, a metal strip constituting an outer arm portion having its inner end adjustably connected to said inner arm portion with its flat surfaces adapted to lie substantially parallel to the surface of a windscreen over which the arm is adapted to move, a 180° twist imparted to a short section of said strip, to cause the surface of the strip which faces the windscreen at the inner end of the strip to face away from the windscreen at the outer end of the strip, said outer end still having both flat surfaces substantially parallel to the windscreen, and a blade attaching means at the outer end of the strip.

4. A windscreen wiper arm comprising an arm head which incorporates means for securing the head to a driving spindle, an inner arm portion of channel-shaped cross-section pivotally connected to the arm head, a metal strip constituting an outer arm portion, means securing the inner end of the strip within the channel of the inner arm portion, blade attaching means at the outer end of said strip, and a portion of said strip adjacent to, but spaced from said outer end having a 180° twist around the longitudinal axis of the strip.

References Cited in the file of this patent

UNITED STATES PATENTS

| | | |
|---|---|---|
| 1,562,898 | Litot | Nov. 24, 1925 |
| 1,730,465 | Lochrie | Oct. 8, 1929 |
| 1,920,730 | Wiseman | Aug. 1, 1933 |
| 2,215,371 | Horton | Sept. 17, 1940 |